United States Patent
Eshman et al.

(10) Patent No.: US 12,537,843 B2
(45) Date of Patent: Jan. 27, 2026

(54) CYBERSECURITY RISK ASSESSMENT AND REMEDIATION TOOL

(71) Applicant: Capital One Services, LLC, McLean, VA (US)

(72) Inventors: Andrew Eshman, Fairfax, VA (US); Mohamed Seck, Aubrey, TX (US); Ibrahima Mbaye, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 204 days.

(21) Appl. No.: 17/876,218

(22) Filed: Jul. 28, 2022

(65) Prior Publication Data

US 2024/0039946 A1 Feb. 1, 2024

(51) Int. Cl.
*H04L 9/40* (2022.01)
*G06F 21/56* (2013.01)
*G06Q 10/0635* (2023.01)

(52) U.S. Cl.
CPC ..... *H04L 63/1433* (2013.01); *G06Q 10/0635* (2013.01); *G06F 21/56* (2013.01); *G06F 2221/034* (2013.01)

(58) Field of Classification Search
CPC .......... H04L 63/1433; G06Q 10/0635
See application file for complete search history.

(56) References Cited

U.S. PATENT DOCUMENTS

| | | | |
|---|---|---|---|
| 9,306,913 B1* | 4/2016 | Volkov | H04L 63/029 |
| 2002/0169625 A1* | 11/2002 | Yang | G06Q 30/018 |
| | | | 705/317 |
| 2003/0200149 A1* | 10/2003 | Gonzalez | H04L 41/082 |
| | | | 705/26.1 |
| 2014/0007229 A1* | 1/2014 | Smith | G06F 21/57 |
| | | | 726/22 |
| 2014/0165204 A1* | 6/2014 | Williams | G06F 21/55 |
| | | | 726/25 |
| 2016/0044058 A1* | 2/2016 | Schlauder | H04L 63/1433 |
| | | | 726/25 |
| 2017/0257303 A1* | 9/2017 | Boyapalle | H04L 67/34 |
| 2018/0146004 A1* | 5/2018 | Belfiore, Jr. | G06F 21/577 |
| 2020/0076845 A1* | 3/2020 | Mathew | H04L 63/1425 |
| 2020/0106799 A1* | 4/2020 | Sauve | H04L 63/1433 |
| 2020/0389482 A1* | 12/2020 | Engle | G06N 20/00 |
| 2021/0133648 A1* | 5/2021 | Bennett | G06F 21/6245 |
| 2021/0409441 A1* | 12/2021 | Singh | H04L 63/1433 |

* cited by examiner

*Primary Examiner* — Daniel B Potratz
*Assistant Examiner* — Aditya Sriram
(74) *Attorney, Agent, or Firm* — Foley & Lardner LLP

(57) ABSTRACT

Disclosed embodiments pertain to cybersecurity assessment and remediation. A questionnaire comprising a set of questions can be generated and provided electronically to a device of a small business representative. In one instance, the questionnaire can be dynamically responsive to input to focus on questions relevant to a particular business. Responses to questions can be used to generate a score that captures cyberattack readiness and a recommendation to reduce cybersecurity risk. Further, tests can be executed on a technology stack of the business. Test results can then be employed as a basis to generate the score and recommendation.

20 Claims, 10 Drawing Sheets

CYBERSECURITY RISK ASSESSMENT AND REMEDIATION TOOL

BACKGROUND

Cybersecurity concerns protecting computing devices, networks, programs, and data from attack, theft, damage, and service disruption. Vulnerabilities are design, operation, or control weaknesses that a malicious individual can exploit to attack computing assets, including hardware, software, and data. A successful cyberattack can have a massive negative impact on business operations, finances, and reputation. For example, operations can be controlled remotely, shut down, or held for ransom, financial accounts can be drained, and proprietary or customer data can be stolen.

SUMMARY

The following presents a simplified summary to provide a basic understanding of some aspects of the disclosed subject matter. This summary is not an extensive overview. It is not intended to identify necessary elements or delineate the scope of the claimed subject matter. Rather, this summary presents some concepts in a simplified form as a prelude to the more detailed description presented later.

Briefly described, disclosed aspects relate to cybersecurity risk assessment and remediation. In one embodiment, a computer-implemented tool or network service is provided that assesses cybersecurity risk and determines a remediation strategy. In one instance, information can be solicited from a business representative with an electronic questionnaire or form that changes dynamically to focus on questions relative to the business based on responses to prior questions. Additional information can be acquired by evaluating a business' technology stack. The information can subsequently be utilized to compute a score that captures cyberattack readiness. Further, the information can be analyzed to determine a recommendation to improve cyberattack readiness. For example, the recommendation can identify software to install or remove. Additionally, or alternatively, the recommendation can concern the reconfiguration of current software and instructions as to how to effect the reconfiguration.

According to one aspect, disclosed embodiments can include a system that comprises a processor coupled to a memory that includes instructions that, when executed by the processor, cause the processor to transmit a self-assessment electronic questionnaire to a computing device of a representative of a business entity, wherein the questionnaire is responsive to industry type input by the representative to focus on questions relevant to the business entity, identify a technology stack for the business entity from the questionnaire, evaluate the technology stack with one or more tools, compute a score for the business entity based on a response to the questionnaire and a result of technology stack evaluation, wherein the score captures cyberattack readiness, determine a recommendation based on the response to the questionnaire and the result of the technology stack evaluation that improves cyberattack readiness, and communicate the score and recommendation to the computing device of the representative of the business entity. In one instance, the recommendation can comprise installation of a software product or configuration instructions for an installed software product. The instructions can further cause the processor to determine a regulatory requirement applicable to the business, evaluate compliance with the regulatory requirement based on the response to the questionnaire, the result of the technology stack evaluation, or both and update the score and recommendation based on a result of compliance evaluation. Further, the instructions can cause the processor to determine the regulatory requirement based on a location associated with the business received from the response to the questionnaire. Instructions can also cause the processor to search the dark web for information regarding the business and update the score and recommendation based on the result of the search. Furthermore, the instructions can cause the processor to detect overprovisioning of functionality associated with an installed product, determine corrective action to mitigate the overprovisioning and communicate the corrective action to the representative of the business entity. The instructions can further cause the processor to determine an uninstalled product for the recommendation, acquire a discount code for purchase of the uninstalled product, and provide the discount code and the uninstalled product in the recommendation.

In accordance with another aspect, disclosed embodiments can include a method comprising executing, on a processor, instructions that cause the processor to perform operations associated with assessing and addressing cybersecurity. The operations include generating a set of cybersecurity questions based on the industry type of a small business, transmitting the set of cybersecurity questions to a computing device of a representative of the business, and dynamically updating the set of cybersecurity questions to remove an irrelevant question determined based on a response to one or more other questions, generating a score based on answers to the set of cybersecurity questions that captures cyberattack readiness, determining a recommendation that reduces cybersecurity risk based on the answers to the set of cybersecurity questions, and conveying the score and recommendation to the computing device of the representative of the business. The operations can further comprise executing one or more tests on a technology stack of the small business and augmenting the score and recommendation based on a result of the one or more tests. Further, the operations can comprise identifying regulatory requirements based on the industry type, determining compliance with the regulatory requirements based on the answers, and generating a score that captures regulatory compliance. The operations can also comprise determining a setting change in an operating environment that reduces cybersecurity risk and identifying the change as the recommendation. In one instance, the operations can also include generating a set of one or more instructions operable to implement the setting change and providing the set of one or more instructions as part of the recommendation. Further, the operations can comprise determining a software product that reduces the cybersecurity risk and identifying the software product as the recommendation. The operations can additionally comprise selecting the software product from a set of one or more preferred software products. In one instance, the operations can also comprise identifying redundant software products from a technology stack of the business and generating the recommendation further comprises suggesting the removal of one or more redundant software products. Furthermore, the operations can comprise identifying a second cybersecurity score associated with another small business, comparing the cybersecurity score to the second cybersecurity score, and reporting a result of the comparison with the cybersecurity score. Further yet, the operations can comprise searching the dark web for information about the business and updating the score and recommendation based on a result of the search.

According to yet another aspect, disclosed embodiments can include a computer-implemented cybersecurity method. The method comprises generating a set of cybersecurity questions based on industry type of a small business, transmitting the set of cybersecurity questions to a computing device of a representative of the business, receiving answers to the set of cybersecurity questions, executing one or more tests on a technology stack of the business, generating a score, based on the answers and result of the one or more tests, that captures cyberattack readiness, determining a recommendation that reduces cybersecurity risk based on the answers and the results of the one or more tests, transmitting the score and recommendation to the computing device of the representative of the business. The method further comprises dynamically updating the cybersecurity questions in response to one or more answers to remove irrelevant questions.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Businesses and other organizations need to be proactive in developing and implementing a cybersecurity strategy to protect against threats and respond to attacks to prevent and mitigate damage when an attack occurs. However, owners and employees of sole proprietorships and small businesses are typically unaware of cyber threats and lack technical proficiency or specialists to deal with cybersecurity issues. As a result, such businesses or organizations can be vulnerable to attack.

Disclosed embodiments pertain to cybersecurity assessment and remediation. In one embodiment, the cybersecurity assessment and remediation can be included as part of a tool for owners and employees of sole proprietorships or small businesses. The tool can generate an electronic questionnaire or form comprising a plurality of questions regarding the business and technology stack employed by the business. Further, the questionnaire can be dynamically responsive to input, including industry type, to focus on questions relevant to a business entity. Questionnaire responses can form the basis for generating a score and recommendation related to cyberattack readiness. The business technology stack can also be evaluated or tested. The result of such an evaluation can then influence the score and recommendation. In addition to cybersecurity, regulatory compliance can be assessed and used to produce a separate score and recommendation, or alter a single score and recommendation in another embodiment. Furthermore, the technology stack can be evaluated for inefficiencies and redundancies. A recommendation can be generated to add or remove a product to improve the technology stack or reduce the cost associated with the technology stack.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
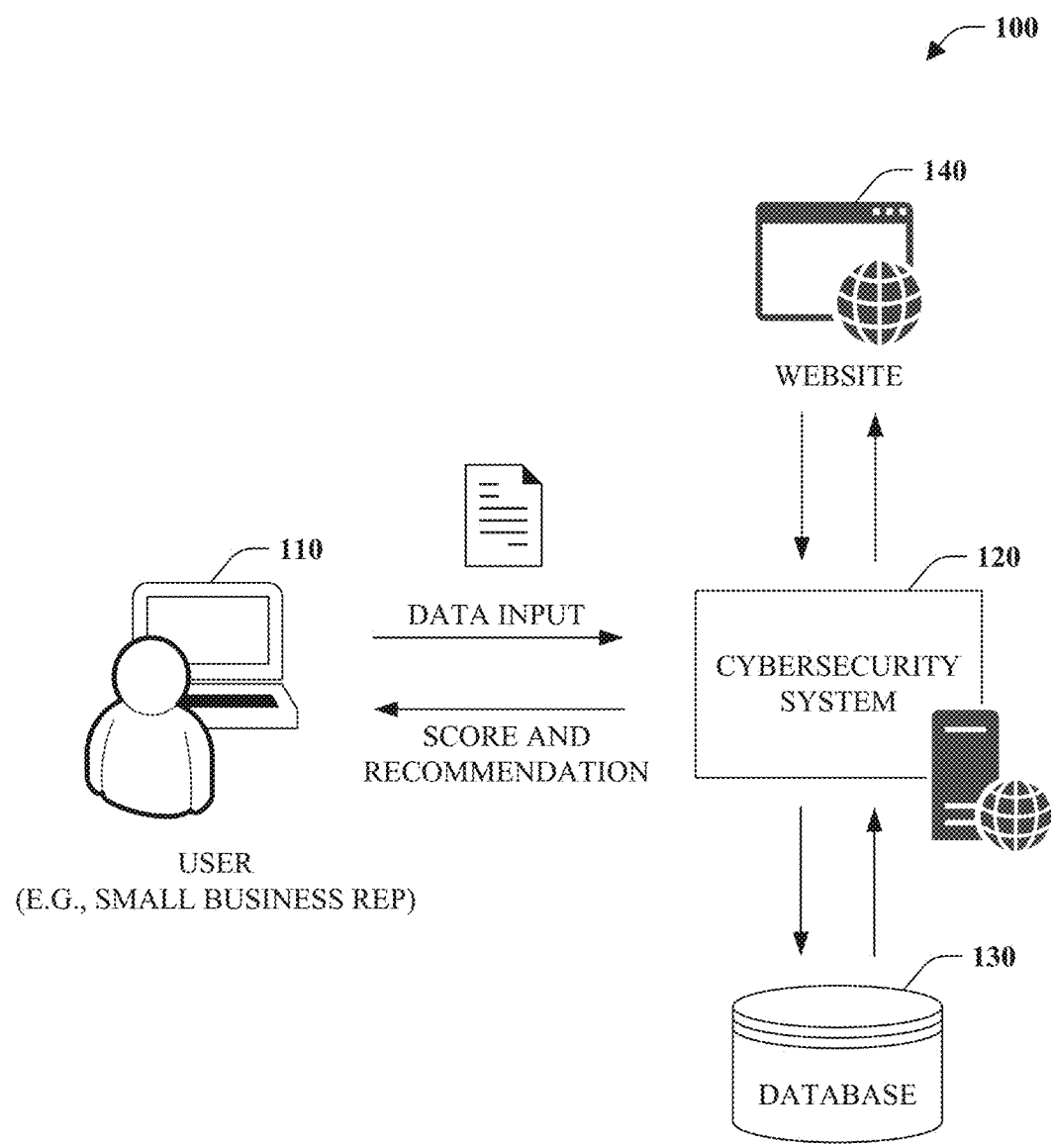
FIG. 1 illustrates an overview of an example implementation.

Referring initially to FIG. 1, a high-level overview of an example implementation 100 is depicted. The implementation 100 includes a user computing device 110, cybersecurity system 120, database 130, and website 140.

The computing device 110 is illustrated in the implementation 100 as a laptop computer. However, the computing device 110 can correspond to a processor-based device including, but not limited to, a desktop computer, laptop computer, tablet, server, or smartphone. The computing device 110 is communicatively connected to the cybersecurity system 120. For example, the computing device 110 can connect to a network, such as a local area network or wide area network (e.g., Internet) which can be used to communicate with the cybersecurity system 120.

The cybersecurity system 120 is configured to assess and remediate cybersecurity risks associated with a business entity, such as a sole proprietorship or small business. The cybersecurity system 120 can request and receive data regarding the business entity through a questionnaire. For instance, the system can generate a questionnaire comprising a number of questions regarding a business entity and provide the questionnaire to the user computing device 110. The questions can concern industry, country, environments (e.g., on-premises data center, hybrid (on-premises/cloud or software as a service (SaaS)), data types (e.g., personally identifiable information (PII), financial, health), number of employees, number of endpoints, website security, encryption (e.g., at rest, in transit), credential management, email security, backup, data loss prevention, antivirus, operating system, firewall, log management, remote access, and types of endpoints (e.g., mobile, desktop, server). In one instance, the questions can be based on established best security practices. Moreover, questions can be tailored to a particular business or type of business. In one embodiment, the questionnaire is interactive and responsive to input to focus on questions relevant to the business entity.

The cybersecurity system 120 can be operable to receive data from a questionnaire and generate a score that captures a level of security or attack readiness. In one embodiment, the score can correspond to a number, for instance, between zero and one hundred, wherein a large number is indicative of a higher level of security than a small number. The score can be computed based on several factors associated with data acquired from the questionnaire. For example, the score can be increased when encryption is employed when data is communicated but reduced somewhat if data is not encrypted in place or where stored. The received data and the score can be stored in the database 130 for subsequent retrieval and use. The database can also store competitor scores or average industry scores, which can be presented in conjunction with a computed score for comparison purposes. For example, a numerical score (e.g., 70) may not be easy to understand alone. By providing additional context, the score can be more comprehensible. For example, suppose the score is seventy and the industry average is fifty. In that case, it is easy to understand that although cybersecurity is not perfect, it is at a level that exceeds the industry average. By contrast, a score of thirty can indicate a level much less than the industry average.

The cybersecurity system 120 can also be configured to generate recommendations to improve the score and cybersecurity readiness. The recommendations can be based on data provided in the questionnaire. The recommendations can correspond to product recommendations, actions, or configurations to employ. In a simple example, if a business indicates that it does not use antivirus software, the recommendation can include acquiring and loading antivirus software. Similarly, suppose the business uses a version of application or system software that is outdated. In that case, the recommendation can be to upgrade to the next version to exploit safeguards unsupported in a previous version potentially. Further, if the business employs an environment that includes diverse options for security settings, the recommendation can correspond to setting a configuration, potentially including instructions as to how to activate certain features. For example, an environment offering software or a system as a service (e.g., Microsoft 365®) may not include multiform factor authentication by default. However, multiform factor authentication can be activated by altering environment settings. In this instance, the recommendation can be to enable dual-factor authentication, including directions on how to enable such authentication in a given environment.

In addition to acquiring data through a questionnaire, the cybersecurity system can be configured to evaluate a technology stack of a business. A technology stack is a set of technologies that a business utilizes, including hardware and software. For example, the business can have a website, backend database, spreadsheet software, customer relations management system, and an inventory system. The technology stack can be evaluated by executing one or more tests designed to reveal potential vulnerability issues in one embodiment. Evaluation results can subsequently be employed to adjust the score and recommendation.

As shown in the implementation 100, the cybersecurity system 120 can evaluate a website 140 of a business entity. In one instance, a test can be initiated and performed that evaluates the website's security. For example, the test can be an open-source secure socket layer (SSL) test that determines whether the website has a valid certificate. As another non-limiting example, a test can determine whether the website has expired. Of course, these are solely two example tests to facilitate clarity and understanding. The cybersecurity system 120 can employ a suite or toolbox of tests regarding security or other aspects of a technology stack. Further, test results can influence the score and recommendation provided by the system. For example, if a test reveals that the website lacks a valid certificate, the score can be adjusted to reflect this condition, and updating the certificate can be recommended.

Per one embodiment, the cybersecurity system 120 can also operate with respect to regulatory or other restrictions. Restrictions can dictate the use of technology to protect customer data, such as personally identifiable information (PII), healthcare data, and financial data. For example, suppose a business accepts credit card payments. In that case, the business must be compliant with security standards set forth by the payment card industry (PCI) standards, which can include installing and maintaining a firewall, protecting stored cardholder data, encrypting the transmission of cardholder data across public networks, and using and regularly updating antivirus software. Similarly, if a business deals with healthcare data, the restriction can include access control and encrypting data at rest and in transit. Accordingly, restrictions can require additional or different security mechanisms to comply than may otherwise be needed.

The cybersecurity system 120 can also be configured to search the dark web for data regarding the business. The dark web is a part of the World Wide Web accessible with special software that allows users and website operators to remain anonymous and untraceable. The dark web can be a source of information regarding potential attacks and system vulnerabilities, among other things. The dark web can be searched for information related to a particular business, such as stolen user credentials or credit cards. Further, the dark web can be mined for information regarding potential future attacks on the business, industry, or in general. The cybersecurity system 120 can account for this or other information in determining a cybersecurity score and recommendation.

Figure 2:
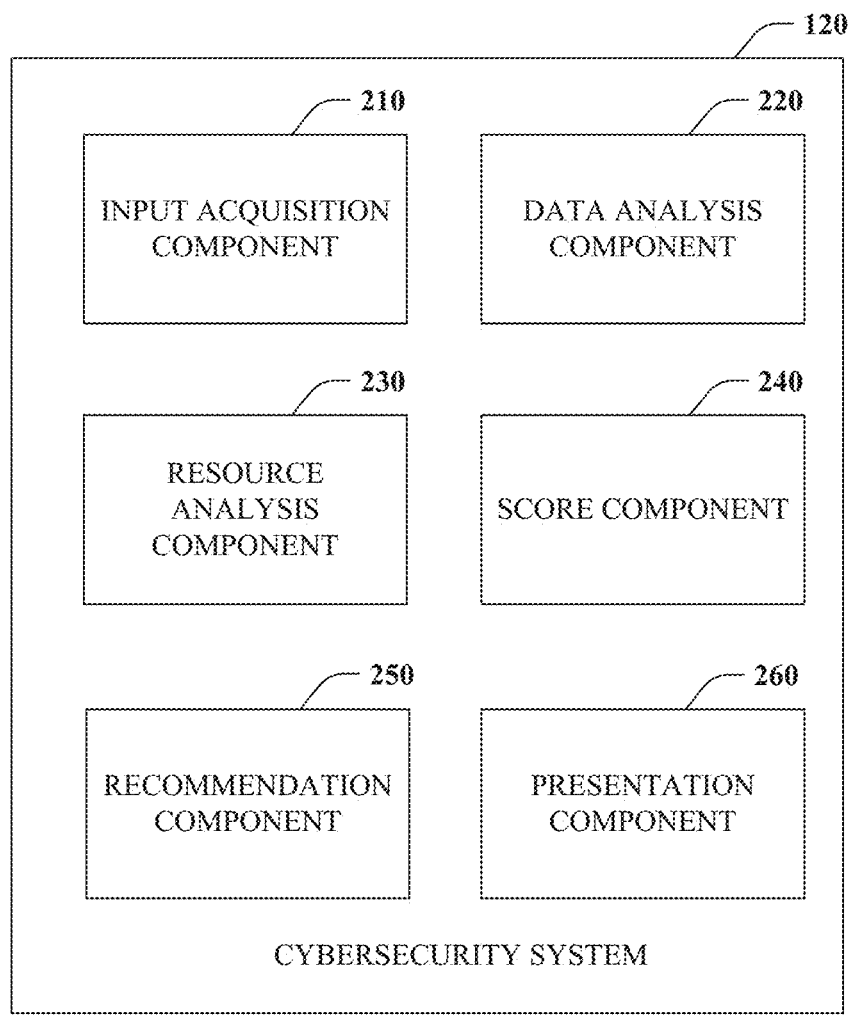
FIG. 2 is a block diagram of an example cybersecurity system.

FIG. 2 illustrates an example cybersecurity system 120 in further detail. The cybersecurity system 120 can include input acquisition component 210, data analysis component 220, resource analysis component 230, score component 240, recommendation component 250, and presentation component 260.

The input acquisition component 210 can be configured to receive, retrieve, or otherwise obtain or acquire data or information from a business representative. In one embodiment, the input acquisition component 210 can generate a set of one or more questions. The questions can be based on best security practices and regulatory requirements. For example, the questions can solicit information about a business' industry, country, environments (e.g., on-premises data center, hybrid (on-premises/cloud or software as a service (SaaS)), data types (e.g., personally identifiable information (PII), financial, health), number of employees, number of endpoints, website security, encryption (e.g., at rest, in transit), credential management, email security, backup, data loss prevention, antivirus, operating system, firewall, log management, remote access, and types of endpoints (e.g., mobile, desktop, server). The questions can be embodied in a form, questionnaire, or the like. Per one embodiment, the form or questionnaire can be interactive and dynamically updated to ensure questions are relevant to a particular business and technology stack. In this manner, individuals are not burdened with determining which questions are relevant or responding to irrelevant questions.

Figure 3:
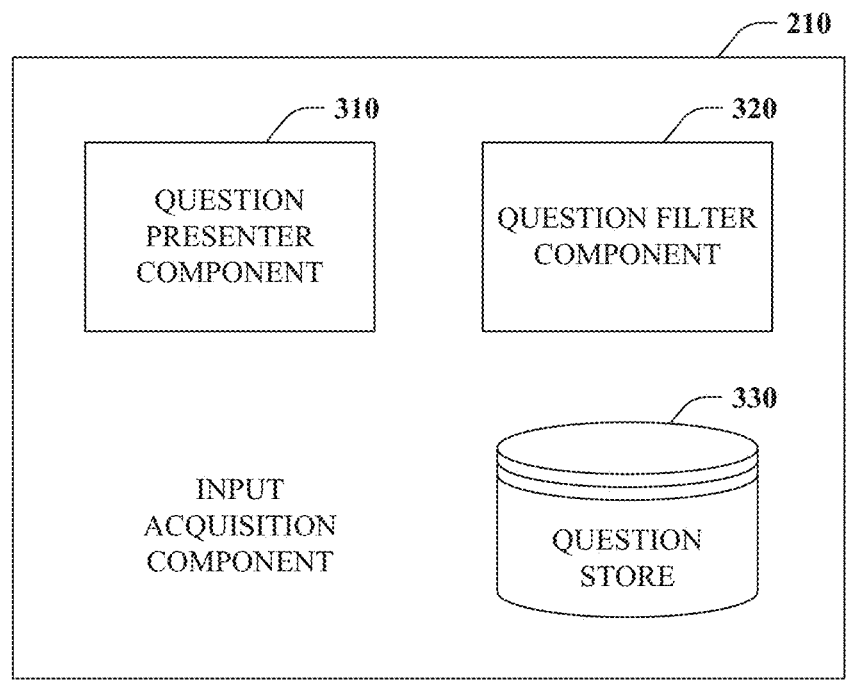
FIG. 3 is a block diagram of a sample input acquisition component.

Turning attention briefly to FIG. 3, a sample input acquisition component 210 is illustrated. The input acquisition component 210 can include question presenter component 310, question filter component 320, and question store 330.

The question presenter component 310 can be operable to solicit data or information from an individual, such as a business representative (e.g., owner, employee). More specifically, the question presenter component can present a question to the individual and receive a response to the question. A question can be presented by displaying question text. Of course, the question can be presented by other means including, but not limited to, audio. The question presenter component 310 can provide questions as a questionnaire, electronic form, or the like in various embodiments. The questions can pertain to the business, best security practices, and regulatory requirements, among other things.

The questions can be persisted to and retrieved from the question store 330. The question store 330 can be a non-volatile data storage device, such as a database, which stores a collection of data to allow the data to be electronically accessed, manipulated, and updated. In one instance, the question presenter component 310 can retrieve one or more questions or queries from the question store 330 for a form or questionnaire. In addition, the question store 330 or another dedicated data store can save answers to questions.

The question filter component 320 can be operable to remove or add questions based on responses provided to one or more other questions. All questions stored in the question store 330 are not relevant to every business. Further, unlike a large business that may employ security experts, small businesses may lack knowledge of which questions are relevant and which are not. The question filter component 320 can assist by focusing on questions relevant to an entity. Information about a business can be provided in advance of presentation of questions. Additionally, or alternatively, information about a business can be solicited and received in response to questions. Regardless of how acquired, the information can be utilized by the question filter component 320 to select some questions and discard other questions. The question filter component 320 can operate at a high industry-type level or more granular level. For example, questions can differ for finance, fitness training, and restaurant businesses. Accordingly, a set of questions can be provided based on industry. Furthermore, the questions can be filtered based on other data or information provided in answers to questions. For example, if it is determined that a business is cash-only, questions regarding credit card payment data and systems can be removed. Further yet, geographic location (e.g., country, state, city, county) of a business or customers of the business can be a pertinent factor with regulatory requirements. Accordingly, the question filter component 320 can filter regulatory requirement questions based on location.

Returning to FIG. 2, the data analysis component 220 can be operable to analyze question responses in view of best practices or the like. Answers to questions can provide information about the current state of a business with respect to cybersecurity. Best practices can correspond to recommended cybersecurity practices for the business. The data analysis component 220 can determine the difference between what the business is currently doing with respect to cybersecurity and what the business should be doing, given best practices as well as applicable regulatory requirements. Determining this difference subsequently aids in generating a cybersecurity score and recommendation, among other things, as discussed further hereinafter.

The resource analysis component 230 can be operable to analyze a business' technology stack. A technology stack is a set of technologies that a business utilizes, including hardware and software. The business can have a website, backend database, spreadsheet software, customer relations management system, and an inventory system. In one instance, the technology stack can be evaluated by executing one or more tests designed to reveal potential vulnerability issues.

Figure 4:
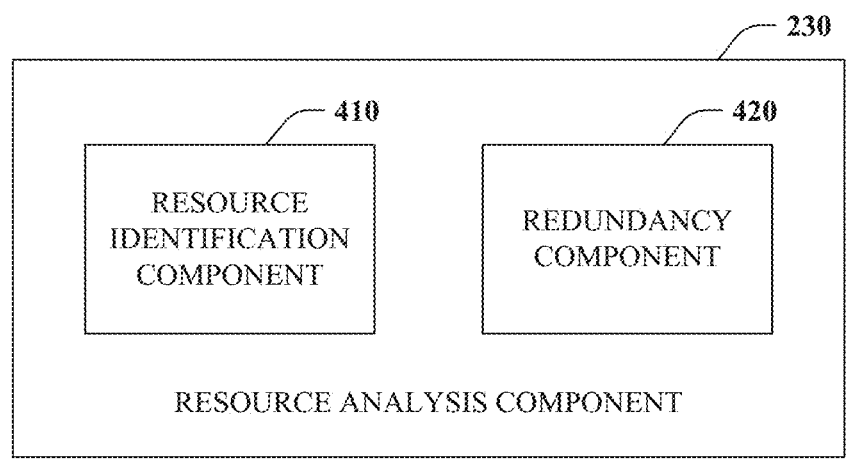
FIG. 4 is a block diagram of a sample resource analysis component.

Turning briefly to FIG. 4, a sample resource analysis component 230 is provided in further detail. The resource analysis component 230 can include resource identification component 410 and redundancy component 420.

The resource identification component 410 can be operable to determine hardware and software resources comprising a business' technology stack. The resource identification component 410 can scan the technology stack to determine resources. For example, the resource identification component 410 can be installed on a business computing device, or access can be provided to a remote identification component 410. Further, the resource identification component 410 can determine corresponding settings or configurations. For instance, the resource identification component 410 can identify a merchant website for purchasing goods or services as well as whether or not the website uses a secure socket layer (SSL) and is associated with a valid certificate. Various tests can be performed to make such a determination. As another example, a determination can be made as to whether encryption is used on data stored in business databases and communicated within the business.

The redundancy component 420 can be operable to identify unneeded or redundant resources. The redundancy component 420 can analyze resources identified by the resource identification component 410. The analysis can focus on the functionality and capability of cybersecurity systems. For example, if the resource identification component discovers that multiple virus scan programs are employed within the technology stack, the redundancy component 410 can identify these programs as redundant or superfluous. In this way, inefficient resource usage can be determined by identifying programs scanning for the same virus multiple times. Similarly, the redundancy component 420 can identify instances in which encrypted data is being encrypted, which may not be necessary or desired.

Returning to FIG. 2, the score component 240 can be operable to generate a score that captures a business' readiness for a cyberattack. The score can indicate the degree to which a business employs best practices to prevent or mitigate the impact of a cyberattack on the business. Similar to a credit score that indicates an individual's capacity to repay a loan, the score indicates the capacity of a business to defend against a cyberattack. The score, or a different score, can also capture the level of compliance with applicable regulatory requirements. The score can be a number, such that the greater the number, the better the business is deemed to be ready for a cyberattack. Of course, the score meaning could be reversed such that the greater the score, the higher the risk of being unable to defend against an attack. Further, the score is not limited to being a number. In one instance, the score can be a letter (e.g., A+, A, B+, B) or correspond to a class or category (e.g., poor, fair, good, excellent). Various factors can be considered with various weights, such as the presence or absence of a virus or malware prevention program, employment of encryption, and secure communication. The score component 240 can employ results or input from the data analysis component 220, the resource analysis component 230, or both to compute a score.

The recommendation component 250 can be operable to recommend one or more products or configurations to improve cyberattack readiness. The recommendation component 250 can receive, retrieve, or otherwise obtain or acquire results produced by the data analysis component 220, the resource analysis component 230, or both for determining a recommendation. For example, the data analysis component 220 can identify the difference between what the business says they do versus what should be done following best practices or what is required by one or more applicable regulations. Results from the resource analysis component 230 can be used to verify a statement in response to a question against resources present in the business' technology stack. Further, results of one or more tests can identify additional vulnerabilities. In a straightforward scenario, the recommendation component 250 can determine that the business does not have virus or malware protection and thus recommend installing a virus or malware product. In one instance, the recommendation component 250 can recommend selecting one of a plurality of identified products. In another instance, the recommendation component 250 can recommend a particular product, which may be more effective than others or associated with a discount or sale. Further, the recommendation can suggest deactivating or removing one product for a different product that may be more comprehensive or cost-effective.

In some instances, a business can employ a computing environment comprising a suite of productivity tools (e.g., email, calendar, document creation, video conferencing, file management), for example, in a software as a service (SaaS) architecture (e.g., Microsoft 365®, Google Workspace®). These environments can have built-in tools to protect against cyberattacks. However, the tools may need to be configured. Accordingly, the recommendation component 250 can recommend activating particular settings or configuring tools in a certain manner. Further, the recommendation component 250 can provide step-by-step instructions for configuring the tools. For example, multifactor authentication is often preferred over single-factor authentication (e.g., username and password) but may need to be activated and set up. The recommendation component 250 can recommend multifactor authentication and provide instructions to set up such authentication within an environment. The instructions can be provided in a text document, video, or through a software wizard or assistant that presents a user with a sequence of dialog boxes that guide the user through steps. In another embodiment, the configuration can be automated through a script that performs the steps automatically or with limited user input.

The recommendation component 250 can leverage any available and additional information. For example, the deep web can be searched or mined for information regarding a potential attack or type of attack and utilize this information to determine a recommendation that prevents or mitigates the effects of such an attack.

The presentation component 260 can be operable to provide a business representative with the score as well as recommendations. In one instance, the presentation can provide a scoreboard and perhaps related graphics that identify the score determined by the score component 240. The scoreboard can identify historical scores of the business over time. Additionally, the scoreboard can include scores of similar businesses, such as those of the same size, industry, and location, or an average score of similar businesses to provide context for comparison purposes. The presentation component 260 can also display or otherwise communicate any recommendations determined by the recommendation component 250. For example, the presentation component 260 can communicate recommendations regarding one or both of installing and uninstalling particular products or tools or configurations and optionally instructions to effect a recommended configuration. The presentation component 260 can correspond to or utilize a webpage, email, or text to communicate. In one particular embodiment, the presentation component 260 can correspond to or be incorporated in a chatbot that communicates the score and recommendations.

The cybersecurity system 120 can be embodied as a web application or tool for self-assessment and advice regarding cybersecurity. In one particular instance, an application programming interface (API) can be employed to invoke or execute functionality remote from a business technology stack to evaluate the technology stack and generate questions for a business representative. Alternatively, the cybersecurity system 120 can be installed on a business computing device, or functionality can be split between an installed application and a web or cloud service.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Furthermore, one or more components and/or sub-components can be combined into a single component to provide aggregate functionality. Communication between systems, components, and/or sub-components can be accomplished following either a push and/or pull control model. The components can also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed thereby, making portions of the systems and methods more adaptive as well as efficient and intelligent. By way of example, and not limitation, the cybersecurity system 120 can utilize such mechanisms to automatically determine or infer cybersecurity practices that a business should implement. In one instance, a predictive model can be generated that can infer security practices based on historical attacks and responses that stopped or mitigated future attacks. Further, the predictive model can be industry-specific, such that the practices are tailored to an attack on businesses within a particular industry. Still further yet, such mechanisms can be utilized to predict or infer recommendations to improve cyberattack readiness. In one instance, the mechanism can be utilized to solve an optimization problem in predicting recommendations based on compatibility with existing systems, efficiency, and cost, among other things.

In view of the example systems described above, methods that can be implemented in accordance with the disclosed subject matter will be better appreciated with reference to flow chart diagrams of FIGS. 5-9. While, for purposes of simplicity of explanation, the methods show and describe a series of blocks, it is to be understood and appreciated that the disclosed subject matter is not limited by the order of the blocks, as some blocks can occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
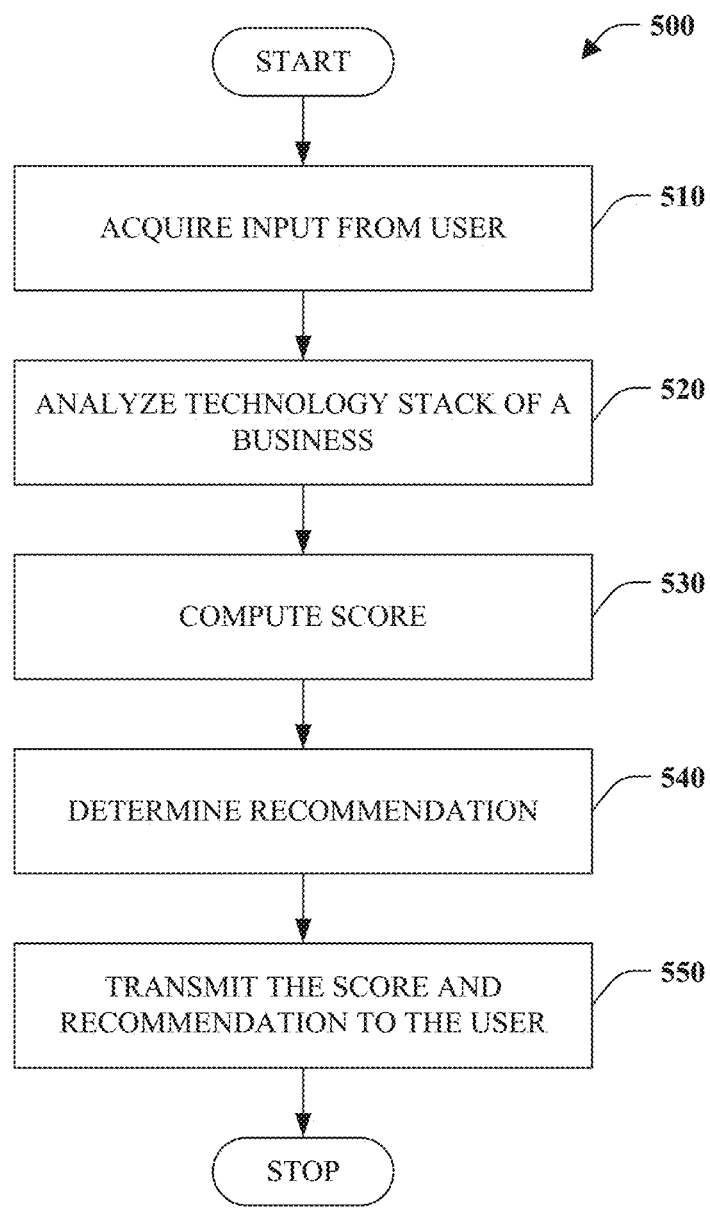
FIG. 5 is a flow chart diagram of a cybersecurity assessment and remediation method.

Turning attention to FIG. 5, a flow chart diagram depicts a method 500 of cybersecurity risk assessment and remediation. The method can be performed by the cybersecurity system 120 and functionality associated with assessing and advising regarding a business' cybersecurity risk.

At numeral 510, the method 500 receives, retrieves, or otherwise obtains or acquires input from a user, such as a business representative (e.g., owner, employee). The input can pertain to a business and the technology stack employed by the business. For example, the input can include a business' industry, country, computing environment, data types (e.g., personally identifiable information (PII), financial, health), number of employees, number of endpoints, website security, encryption, credential management, email security, backup, data loss prevention, antivirus, operating system, firewall, log management, remote access, and types of endpoints (e.g., mobile, desktop, server). In accordance with one embodiment, responses to questions in a questionnaire are the input.

At reference numeral 520, the method 500 can analyze a technology stack of a business. A technology stack is a set of technologies that the business utilizes, including hardware and software. For example, the business can have a website, database, email server, and customer relations management system, among other things. The technology stack can be analyzed by executing one or more tests. In one embodiment, the tests can be designed to reveal potential vulnerability issues. Additionally, or alternatively, the tests can be designed to determine compliance with applicable regulatory requirements. The tests can determine the presence of software and hardware as well as versioning data and configuration, among other things.

At 530, the method 500 computes or otherwise determines a score based on the input and result of the technology stack evaluation. In one embodiment, the score can be deemed a cybersecurity score that captures the readiness for a cyberattack or, in other words, the capacity to defend against a cyberattack. The cybersecurity score can also capture a level of compliance with applicable regulatory requirements. Alternatively, separate cybersecurity and compliance scores can be determined. The score can be a number (e.g., 1-100), letter (e.g., A, A+, B, C), or class or category (e.g., poor, fair, good, excellent). The score can be determined from various factors associated with the input and result of the technology stack evaluation. For example, an operating system version, presence or absence of virus protection, and password policy can be factors. Further, various weights can be associated with factors such that one factor can influence the score more than another factor.

At numeral 540, the method 500 determines a recommendation. The recommendation can be based on one or both of the input from the user and the result of the technology stack evaluation and seek to improve cyberattack readiness or decrease the risk of a successful attack. The recommendation can correspond to updating software to a different version in one instance. For example, a recommendation can be to update the operating system to a newer version. In another instance, the recommendation can be to install a particular product or tool, such as a virus or malware protection. In yet another instance, the recommendation can be to adjust settings associated with a particular product or environment. For example, the recommendation can be to configure settings for multifactor authentication when the default is single-factor authentication. The recommendation can seek to remedy a vulnerability to improve readiness for a cyberattack.

At reference numeral 550, the method 500 transmits the score and recommendation back to the user, such as a business representative. In one embodiment, a report can be generated and communicated that includes the score and recommendation. Further, the report can include historical scores, the current score, and other scores such as the average score in an industry or scores of other businesses in the industry for comparison purposes. Further, the report can include the impact of accepting past recommendations. The recommendation can be presented alone or in conjunction with additional information to aid in implementing a recommendation. For example, a link can be provided to a website to acquire software, or instructions can be provided to change environment settings.

Figure 6:
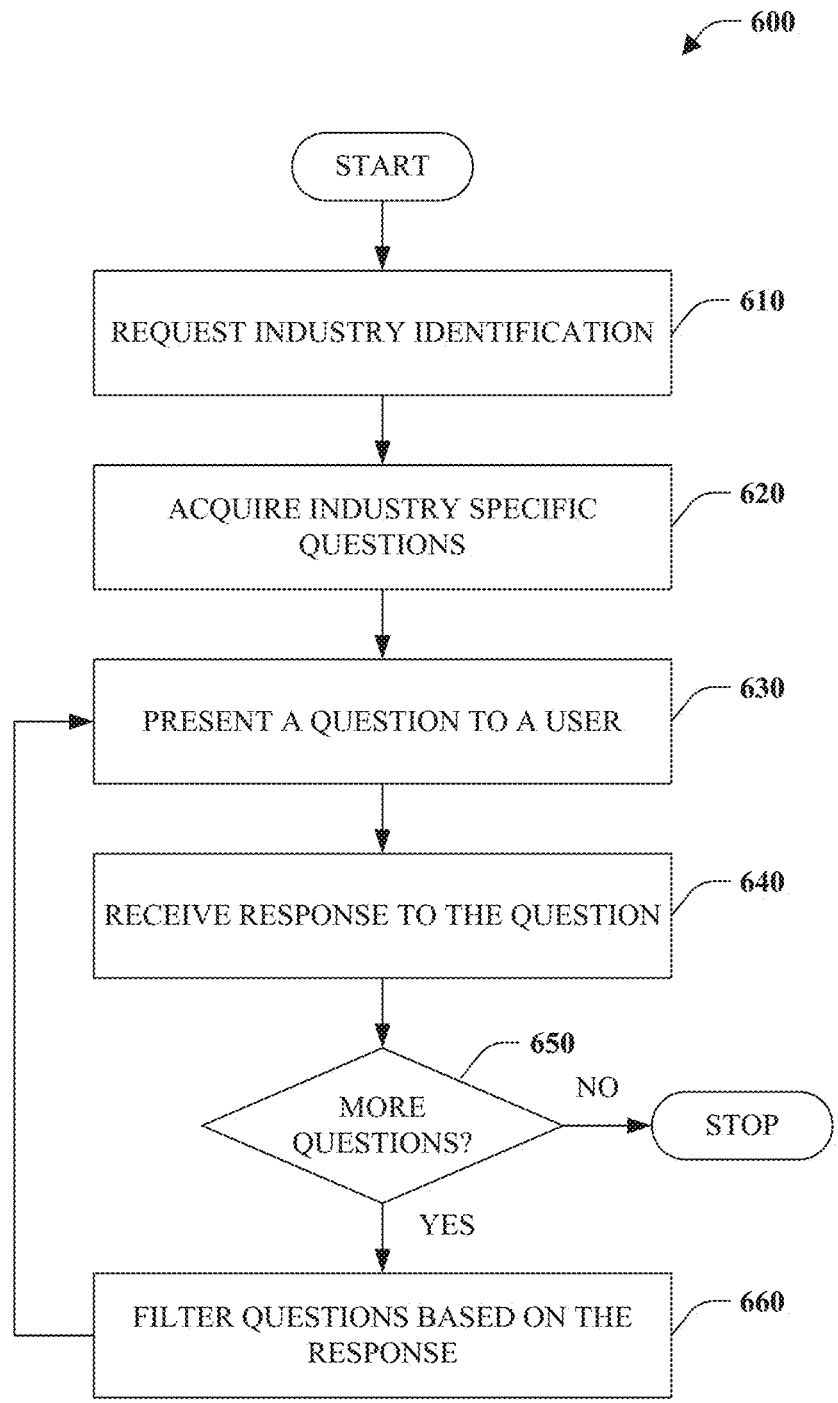
FIG. 6 is a flow chart diagram of a method soliciting input from a user.

FIG. 6 illustrates a flow chart of a method 600 soliciting user input regarding a business or other organization. The method 600 can be implemented and performed by the cybersecurity system 120 and, more particularly, the input acquisition component 210. The method 600 can seek to select relevant questions based on prior responses to questions dynamically. In this manner, a user, such as a business representative, need not navigate through a plethora of questions of little relevance to the business.

At reference numeral 610, the method 600 requests industry identification. In other words, the request is for the industry within which the business operates. Example industries can include retail, restaurant, finance, fitness, healthcare, information technology, and real estate. Of course, these are solely examples as many other industries and sub-industries exist.

At numeral 620, the method 600 receives, retrieves, or otherwise obtains or acquires one or more industry-specific questions. A database can store questions associated with a particular industry per one embodiment. The method can query the database with the industry provided in response to the request to acquire industry-specific questions.

At reference numeral 630, the method 600 presents one of the industry-specific questions to the user, such as a business representative. For example, the question can be presented in an online form or questionnaire. The method receives a response to the question at numeral 640.

At numeral 650, the method 600 determines whether or not there are more questions to be asked of the user. If there are no more questions ("NO"), the method can simply terminate. If there are more questions ("YES"), the method 600 continues at reference numeral 660.

At reference numeral 660, the remaining questions are filtered based on the response to previous questions. The response can provide further context that enables filtering of subsequent questions. Filtering can correspond to removing a question or adding a question based on the context provided by the response and previous responses. For example, the question can identify a location of the business, which can allow filtering of applicable regulatory requirements based on the location. Further, the question can refine the industry to a sub-industry that allows more specific questions to be provided. Subsequently, the method 600 returns to 630, and another question from a filtered set of questions is presented to the user for a response.

Figure 7:
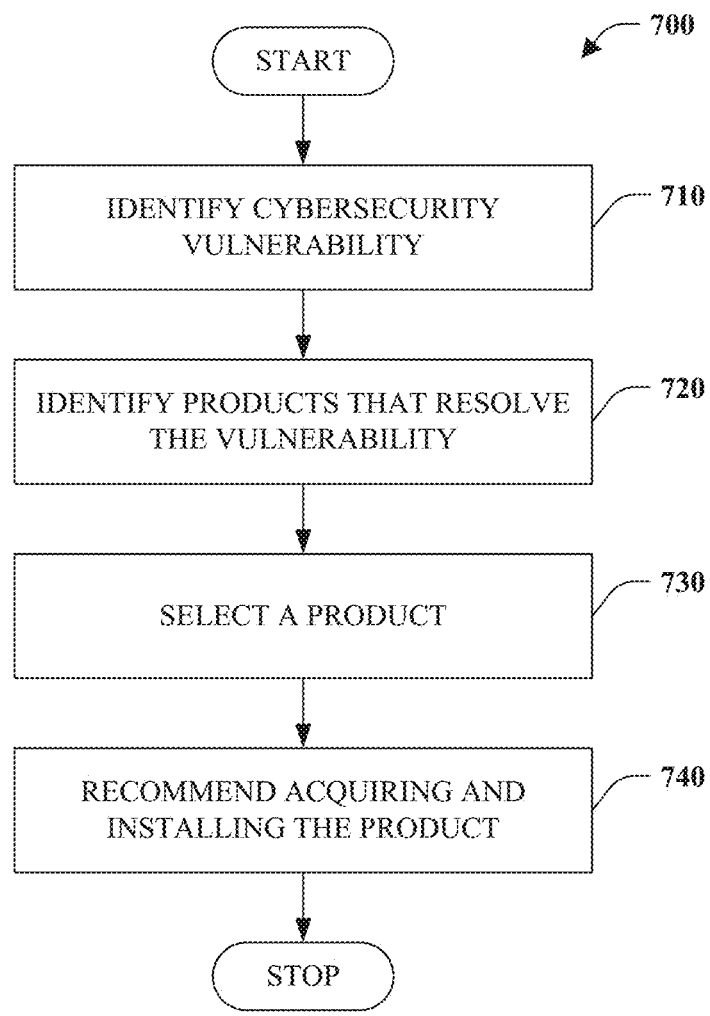
FIG. 7 is a flow chart diagram illustrating a method of recommending a cybersecurity remediation strategy.

FIG. 7 is a flow chart diagram illustrating a method 700 recommending a cybersecurity remediation strategy in accordance with one embodiment. The method 700 can be performed by the cybersecurity system 120 and, more specifically, the recommendation component 250.

At reference numeral 710, the method 700 can identify a cybersecurity vulnerability. The vulnerability can correspond to a deviation from best practices or regulatory requirements that can prevent or limit the effectiveness of cyberattacks. The vulnerability can be identified based on responses to questions from a business representative. For example, the representative may note that the business utilizes a legacy operating system. The vulnerability can also be determined based on analysis of a technology stack of the business. For instance, a script can query an operating system for its current version, which can be a legacy version.

At reference numeral 720, one or more software or hardware products are identified that resolve the vulnerability. In the example above, the latest operating system can be identified. If the vulnerability concerns viruses, an antivirus program can be identified. Similarly, an anti-malware prevention program can be identified if the vulnerability is malware.

At numeral 730, one of the products is selected. For example, various antivirus products exist from different vendors (e.g., Scanguard®, McAfee®, Norton®, Kaspersky®, Malwarebytes®). One program can be selected from amongst the set of antivirus programs. In one instance, an antivirus product can be selected based on a relationship established with the cybersecurity system that provides a discount to customers. Further, the product can be selected to be compatible with the current system and fit the need to eliminate or mitigate the vulnerability. Various other factors can also be considered in selecting a product, such as a preferred or select product.

At reference numeral 740, the method recommends acquiring and installing the product. A link can be provided to navigate to a website to purchase the product in one instance. Further, other products can also be presented to provide additional options if users prefer to compare products.

Figure 8:
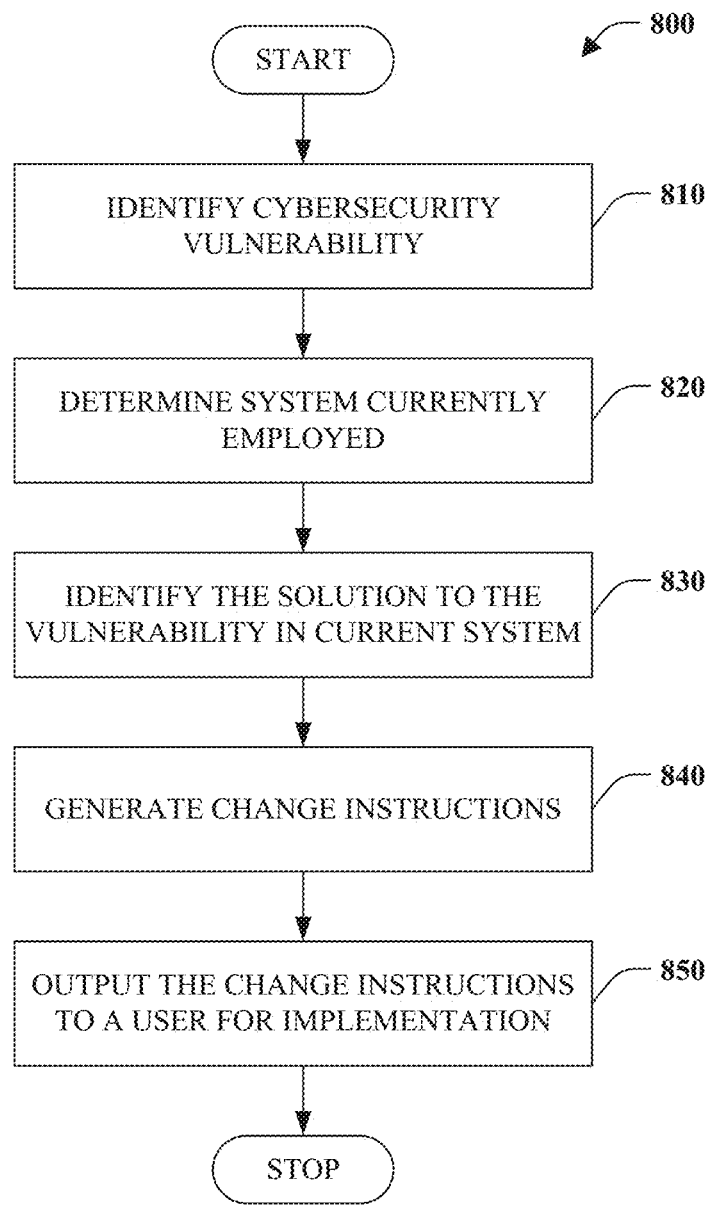
FIG. 8 is a flow chart illustrating a method of recommending a remediation strategy associated with a cybersecurity vulnerability.

FIG. 8 is a flow chart diagram illustrating a method 800 recommending a remediation strategy associated with a cybersecurity vulnerability in accordance with one embodiment. The method 800 can be performed by the cybersecurity system 120 and, more specifically, the recommendation component 250.

At reference numeral 810, a cybersecurity vulnerability can be identified. The vulnerability can correspond to a deviation from best practices or regulatory requirements that can prevent or limit the effectiveness of cyberattacks. The vulnerability can be identified based on responses to questions from a business representative or evaluation of a technology stack of a business. For example, user authentication can be vulnerable. More particularly, it can be determined that the business employs legacy username and password for authentication instead of multifactor authentication.

At numeral 820, the current system employed by a business is determined. The current system or environment can be determined from prior evaluation of the technology stack or in response to questions about the system. For example, the business can employ software as a service systems (SaaS), such as Microsoft 365 or Google Workspace, which provide business applications and collaboration tools.

At reference numeral 830, the method can identify a solution to the vulnerability in the current system or environment. Many systems or environments have built-in security functionality. Absent configuration, default security can be provided. Accordingly, the built-in functionality can be analyzed to identify a configuration or change in settings that address the identified vulnerability. For example, by default, single-factor authentication can be employed. However, the system or environment can support multifactor authentication.

At numeral 840, the method 800 generates or identifies change instructions. The change instructions set forth the steps to perform to reconfigure the current system to activate functionality. For example, step-by-step instructions can be identified for changing the default single-factor authentication to dual-factor authentication. In one embodiment, instructions associated with particular settings can be stored in a database and retrieved as needed.

At reference numeral 850, the change instructions can be output to a user for implementation. In one instance, the identified vulnerability and change that addresses the vulnerability can be output together with the software wizard or assistant that presents a user with a sequence of dialog boxes that guide the user through a series of steps. In another embodiment, the configuration can be automated through a script that performs the steps automatically or with limited user input.

Figure 9:
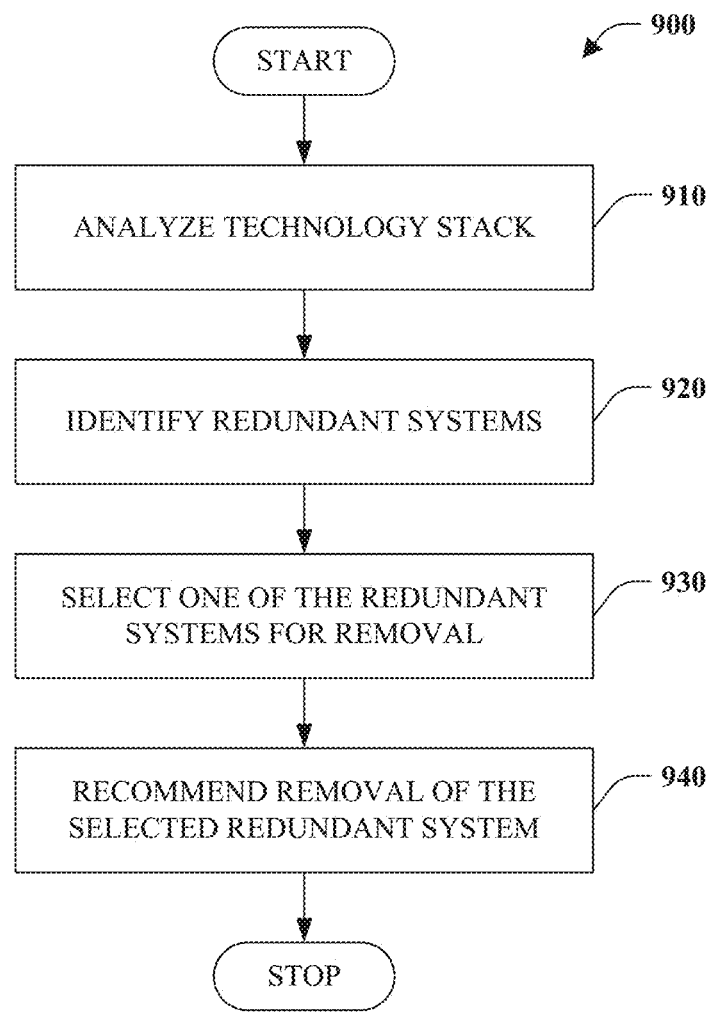
FIG. 9 is a flow chart diagram of a method of recommending removal of redundant resources.

FIG. 9 is a flow chart diagram illustrating a method 900 of recommending removal of redundant resources. The method 900 can be implemented and performed by the cybersecurity system 120 and components thereof.

At reference numeral 910, the method 900 analyzes a technology stack associated with a business. A technology stack is a set of computing technologies that a business utilizes, including hardware and software. For example, the business can have a website, database, spreadsheet software, customer relations management system, and an inventory system. The analysis can focus on identifying the computing technologies in the stack.

At numeral 920, the method 900 can identify redundant systems or technologies. For example, if the technology stack includes two antivirus programs, these antivirus programs can be deemed redundant. In another instance, a computing environment can include built-in functionality that can overlap with other functionality. For example, if the environment encrypts saved data, utilizing a separate program to encrypt the data before saving can be deemed unnecessary or redundant.

At reference numeral 930, the method 900 selects one of at least two redundant systems for removal. The selection can be based on many factors, including cost, effectiveness, and value-added features, among other things. In the example in which a computing environment provides encryption, a separate encryption program or the like can be selected since the environment provides substantial additional valuable features such as business applications and collaboration support.

At numeral 940, the method 900 generates a recommendation to remove the selected redundant system. In one instance, further information can be provided, including the identities of the redundant systems, why the systems are deemed redundant, and the logic behind suggesting the removal of the selected system.

This disclosure pertains to the technical problem of cybersecurity in sole proprietorships or small businesses. These entities may lack dedicated security specialists, knowledge of cybersecurity issues, and technical skills to protect their computing resources from a cyberattack. The technical solution is a computer-implemented cybersecurity risk assessment and remediation tool. Information can be solicited from individuals through a dynamic questionnaire that focuses on questions that are relevant to a business. Further, a technology stack can be evaluated to gather further information. The tool can generate a score that captures a business' readiness for cyberattacks. The tool can also generate recommendations as to the addition of new products or configuration of current products to improve cybersecurity and the score.

Much of the discussion herein has focused on sole proprietorships and small businesses as they typically lack the resources, knowledge, and technical skills to appreciate cyber threats and place mechanisms in place to guard against such threats. Small businesses typically have less than fifteen hundred employees and forty-two million dollars in receipts. However, disclosed aspects are not limited to sole proprietorships or small businesses. In one instance, the aspects can be applied to other organizations or groups that may or may not be technically classified as a business, such as a charity or political group. Further, medium to large businesses can employ such aspects to save time and resources.

As used herein, the terms "component" and "system," as well as various forms thereof (e.g., components, systems, sub-systems . . . ) are intended to refer to a computer-related entity, either hardware, a combination of hardware and software, software, or software in execution. For example, a component can be but is not limited to being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference can be employed to identify a context or an action or may be used to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

Figure 10:
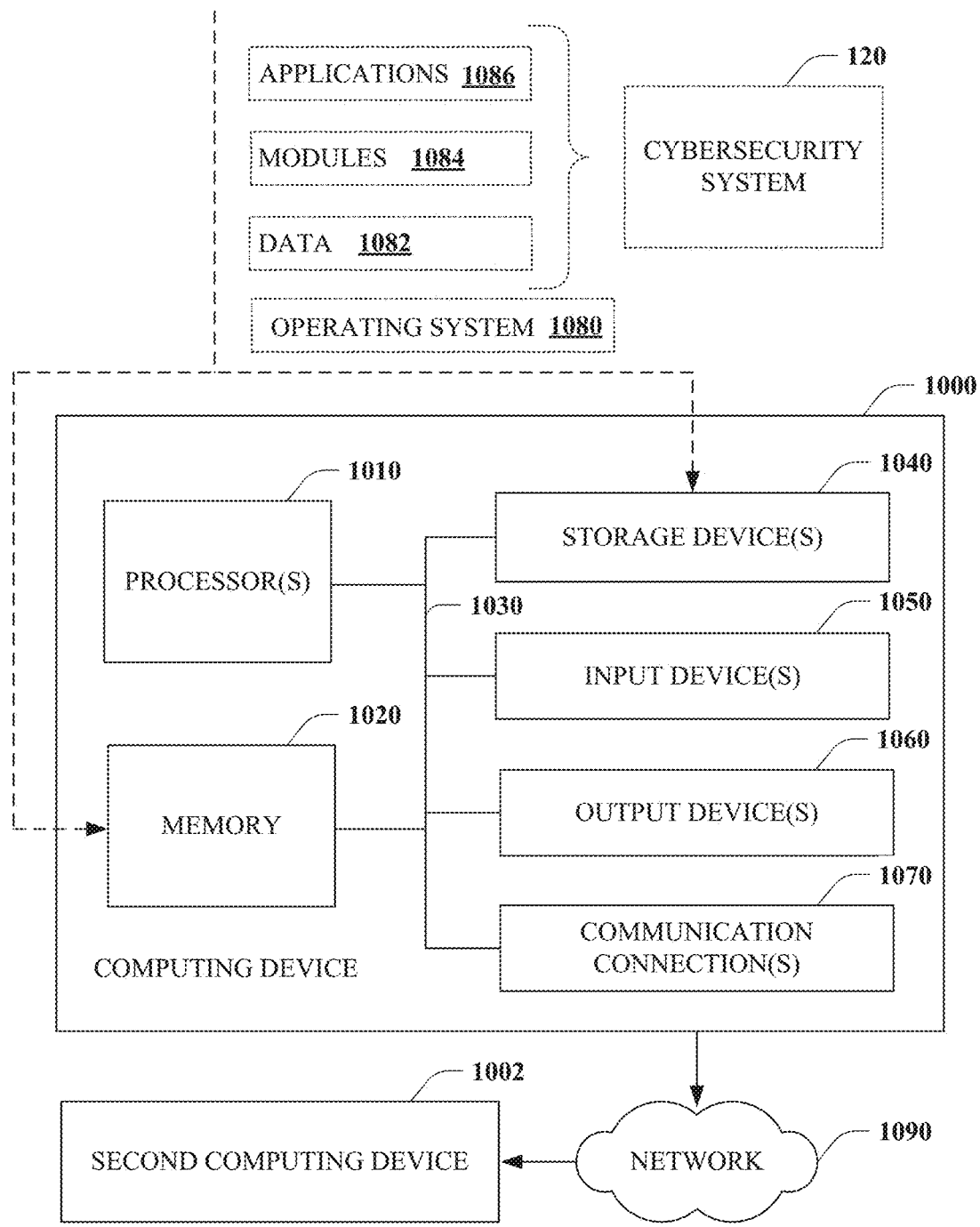
FIG. 10 is a block diagram illustrating a suitable operating environment for aspects of the subject disclosure.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, which perform particular tasks and/or implement particular abstract data types. Moreover, those skilled in the art will appreciate that the above systems and methods can be practiced with various computer system configurations, including single-processor, multi-processor, or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on standalone computers. In a distributed computing environment, program modules can be located in one or both of local and remote memory devices.

With reference to FIG. 10, illustrated is an example computing device 1000 (e.g., desktop, laptop, tablet, watch, server, hand-held, programmable consumer or industrial electronics, set-top box, game system, compute node). The computing device 1000 includes one or more processor(s) 1010, memory 1020, system bus 1030, storage device(s) 1040, input device(s) 1050, output device(s) 1060, and communications connection(s) 1070. The system bus 1030 communicatively couples at least the above system constituents. However, the computing device 1000, in its simplest form, can include one or more processors 1010 coupled to memory 1020, wherein the one or more processors 1010 execute various computer-executable actions, instructions, and or components stored in the memory 1020.

The processor(s) 1010 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 1010 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1010 can be a graphics processor unit (GPU) that performs calculations concerning digital image processing and computer graphics.

The computing device 1000 can include or otherwise interact with a variety of computer-readable media to facilitate control of the computing device to implement one or more aspects of the disclosed subject matter. The computer-readable media can be any available media accessible to the computing device 1000 and includes volatile and nonvolatile media, and removable and non-removable media. Computer-readable media can comprise two distinct and mutually exclusive types: storage media and communication media.

Storage media includes volatile and nonvolatile, removable and non-removable media implemented in any method or technology to store information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1000. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1020 and storage device(s) 1040 are examples of computer-readable storage media. Depending on the configuration and type of computing device, the memory 1020 can be volatile (e.g., random access memory (RAM)), nonvolatile (e.g., read-only memory (ROM), flash memory . . . ), or some combination of the two. By way of example, the basic input/output system (BIOS), including basic routines to transfer information between elements within the computing device 1000, such as during start-up, can be stored in nonvolatile memory, while volatile memory can act as external cache memory to facilitate processing by the processor(s) 1010, among other things.

The storage device(s) 1040 include removable/non-removable, volatile/nonvolatile storage media for storage of vast amounts of data relative to the memory 1020. For example, storage device(s) 1040 include, but are not limited to, one or more devices such as a magnetic or optical disk drive, floppy disk drive, flash memory, solid-state drive, or memory stick.

Memory 1020 and storage device(s) 1040 can include, or have stored therein, operating system 1080, one or more applications 1086, one or more program modules 1084, and data 1082. The operating system 1080 acts to control and allocate resources of the computing device 1000. Applications 1086 include one or both of system and application software and can exploit management of resources by the operating system 1080 through program modules 1084 and data 1082 stored in the memory 1020 and/or storage device(s) 1040 to perform one or more actions. Accordingly, applications 1086 can turn a general-purpose computer 1000 into a specialized machine according to the logic provided.

All or portions of the disclosed subject matter can be implemented using standard programming and/or engineering techniques to produce software, firmware, hardware, or any combination thereof to control the computing device 1000 to realize the disclosed functionality. By way of example and not limitation, all or portions of the analytics-based form completion system 130 can be, or form part of, the application 1086, and include one or more modules 1084 and data 1082 stored in memory and/or storage device(s) 1040 whose functionality can be realized when executed by one or more processor(s) 1010.

In accordance with one particular embodiment, the processor(s) 1010 can correspond to a system on a chip (SOC) or like architecture including, or in other words integrating, both hardware and software on a single integrated circuit substrate. Here, the processor(s) 1010 can include one or more processors as well as memory at least similar to the processor(s) 1010 and memory 1020, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the cybersecurity system 120 and/or functionality associated therewith can be embedded within hardware in a SOC architecture.

The input device(s) 1050 and output device(s) 1060 can be communicatively coupled to the computing device 1000. By way of example, the input device(s) 1050 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 1060, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1050 and output device(s) 1060 can be connected to the computing device 1000 by way of wired connection (e.g., bus), wireless connection (e.g., Wi-Fi, Bluetooth), or a combination thereof.

The computing device 1000 can also include communication connection(s) 1070 to enable communication with at least a second computing device 1002 utilizing a network 1090. The communication connection(s) 1070 can include wired or wireless communication mechanisms to support network communication. The network 1090 can correspond to a personal area network (PAN), local area network (LAN), or a wide area network (WAN) such as the internet. In one instance, the computing device 1000 can correspond to a server executing cybersecurity system 120. The second computing device 1002 can correspond to a business device that interacts with the cybersecurity system 120 to acquire a score and recommendations to improve readiness for a cyberattack. Alternatively, the computing device 1000 can correspond to a business client device that executes a portion of the cybersecurity system 120 locally and communicates with the second computing device 1002 executing another portion of the cybersecurity system 120 remotely as a service over the network 1090.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system for improving resource usage, comprising:
memory; and
one or more processors, coupled to the memory, that configured to cause the system to:
transmit, to a computing device, a dynamic questionnaire that is configured to dynamically update based on a technology stack;
evaluate the technology stack by executing one or more tests that evaluate whether multiple virus scan programs are employed within the technology stack by identifying that the multiple virus scan programs are scanning for a same virus multiple times;
compute, based on one or more responses to the dynamic questionnaire, based on one or more results of the one or more tests that evaluate whether multiple virus scan programs are employed within the technology stack, and based on weights associated with the one or more responses and the one or more results, a score that indicates a readiness for a cyberattack; and
cause, based on the score, deactivation or removal of a program of the multiple virus scan programs.

2. The system of claim 1, wherein the one or more processors are further configured to cause the system to:
evaluate compliance with a regulatory requirement based on one or more of the one or more responses to the dynamic questionnaire or other information; and
update the score based on the compliance with the regulatory requirement.

3. The system of claim 2, wherein the one or more processors are further configured to cause the system to determine the regulatory requirement based on a location associated with the dynamic questionnaire.

4. The system of claim 1, wherein the one or more processors further cause the system to:
detect overprovisioning of functionality associated with an installed product of the technology stack;
determine corrective action to mitigate the overprovisioning; and
communicate the corrective action to the computing device.

5. The system of claim 1, wherein the one or more processors further cause the system to:
determine an uninstalled product;
acquire a discount code for purchase of the uninstalled product; and
provide the discount code and the uninstalled product.

6. A method, comprising:
transmitting, to a computing device, a set of questions that are configured to dynamically update based on a technology stack;
evaluating the technology stack by executing one or more tests that evaluate whether multiple virus scan programs are employed within the technology stack by identifying that the multiple virus scan programs are scanning for a same virus multiple times;
generating a score based on answers to the set of questions, based on one or more results of the one or more tests, and based on weights associated with the answers and the one or more results; and
causing, based on the score, deactivation or removal of a program of the multiple virus scan programs.

7. The method of claim 6, further comprising:
executing one or more other tests on the technology stack; and
augmenting the score based on a result of the one or more other tests.

8. The method of claim 6, further comprising:
determining compliance with regulatory requirements based on the answers, wherein the score is generated further based on the compliance.

9. The method of claim 6, further comprising:
determining a setting change in an operating environment that reduces cybersecurity risk.

10. The method of claim 6, further comprising:
generating a set of one or more instructions operable to implement the setting change; and
providing the set of one or more instructions.

11. The method of claim 6, further comprising:
determining a software product that reduces cybersecurity risk.

12. The method of claim 11, further comprising:
selecting the software product from one or more preferred software products.

13. The method of claim 6, wherein evaluating the technology stack comprises:
evaluating the technology stack by executing the one or more tests and by executing a secure socket layer (SSL) test that evaluates whether a website, of the technology stack, has a valid certificate.

14. The method of claim 6, wherein evaluating the technology stack comprises:
evaluating the technology stack by executing the one or more tests and by executing a test that evaluates whether encryption is used on data stored in one or more databases of the technology stack.

15. The method of claim 6, wherein evaluating the technology stack comprises:
evaluating the technology stack by executing the one or more tests and by executing a test that evaluates whether encryption is used on data stored in one or more databases of the technology stack.

16. The method of claim 6, wherein evaluating the technology stack comprises:
evaluating the technology stack by executing the one or more tests and by a test that evaluates whether encryption of data, in the technology stack, is not necessary or desirable.

17. The method of claim 16, wherein evaluating the technology stack comprises:
determining that an environment, of the technology stack, encrypts saved data; and
identifying that a separate program, in the technology stack, for the encryption of data is not necessary based on determining that the environment encrypts the saved data; and
evaluating the technology stack by executing the one or more tests and based on identifying that the separate program for the encryption of data is not necessary.

18. The method of claim 17, further comprising:
selecting the separate program for removal; and
providing information identifying the separate program as redundant, including an explanation regarding why the separate program is deemed redundant, and including logic for suggesting a removal of the separate program due to the environment encrypting the saved data.

19. One or more non-transitory computer readable media storing instructions that, when executed by one or more processors of a system, cause the system to perform operations comprising:
- transmitting, to a computing device, a dynamic questionnaire that is configured to dynamically update based on a technology stack;
- evaluating the technology stack by executing one or more tests that evaluate whether multiple virus scan programs are employed within the technology stack by identifying that the multiple virus scan programs are scanning for a same virus multiple times;
- computing a score based on one or more responses to the dynamic questionnaire, based on one or more results of the one or more tests, and based on weights associated with the one or more responses and the one or more results; and
- causing, based on the score, deactivation or removal of a program of the multiple virus scan programs.

20. The one or more non-transitory computer readable media of claim 19, wherein the operations further comprise:
- dynamically updating the dynamic questionnaire based on the one or more responses.

* * * * *